United States Patent

De et al.

(10) Patent No.: US 9,128,744 B2
(45) Date of Patent: *Sep. 8, 2015

(54) GENERATING USER-REQUESTED VIRTUAL MACHINE TEMPLATES FROM SUPER VIRTUAL MACHINE TEMPLATES AND CACHEABLE PATCHES

(75) Inventors: Pradipta De, New Delhi (IN); Manish Gupta, New Delhi (IN); Deepak K. Jeswani, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/587,018

(22) Filed: Aug. 16, 2012

(65) Prior Publication Data

US 2013/0326496 A1  Dec. 5, 2013

Related U.S. Application Data

(63) Continuation of application No. 13/482,268, filed on May 29, 2012.

(51) Int. Cl.
G06F 9/455 (2006.01)
G06F 9/445 (2006.01)

(52) U.S. Cl.
CPC .............. *G06F 9/45558* (2013.01); *G06F 8/63* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| 7,356,679 | B1 * | 4/2008 | Le et al. ............................ 713/1 |
| 7,577,722 | B1 * | 8/2009 | Khandekar et al. ........... 709/220 |
| 8,108,855 | B2 * | 1/2012 | Dias et al. ...................... 717/177 |
| 8,141,090 | B1 * | 3/2012 | Graupner et al. .............. 718/104 |
| 8,862,633 | B2 * | 10/2014 | Friedman ...................... 707/803 |
| 8,886,865 | B1 * | 11/2014 | Huang et al. ...................... 711/6 |
| 8,997,095 | B2 * | 3/2015 | Gupta .............................. 718/1 |
| 2005/0044096 | A1 * | 2/2005 | Caliendo et al. .............. 707/102 |
| 2007/0168956 | A1 | 7/2007 | Moore et al. |
| 2008/0005473 | A1 | 1/2008 | Chen et al. |
| 2008/0127348 | A1 * | 5/2008 | Largman et al. ................ 726/24 |
| 2008/0163171 | A1 | 7/2008 | Chess et al. |
| 2008/0163194 | A1 * | 7/2008 | Dias et al. ...................... 717/174 |
| 2008/0307414 | A1 * | 12/2008 | Alpern et al. ...................... 718/1 |

(Continued)

OTHER PUBLICATIONS

Method and System for Faster Deployment of Virtual Machine (Vm) Images, IPCOM000199680D dated Sep. 14, 2010.

(Continued)

*Primary Examiner* — Emerson Puente
*Assistant Examiner* — Benjamin Wu
(74) *Attorney, Agent, or Firm* — Ryan, Mason & Lewis, LLP

(57) ABSTRACT

Techniques for creating a virtual machine super template to create a user-requested virtual machine template. A method includes identifying at least one virtual machine super template to be created via analyzing at least one existing template in a repository and/or a user-defined combination of software, creating the super template by installing software requested by the user to be within the super template, and creating a user-requested virtual machine template by un-installing software from the super template that is not required in the user-requested template and/or adding software to the super template required in the user-requested template that is not present in the super template.

6 Claims, 5 Drawing Sheets

(56) References Cited

U.S. PATENT DOCUMENTS

| | | |
|---|---|---|
| 2009/0198790 A1 | 8/2009 | Grevers, Jr. |
| 2009/0300076 A1 | 12/2009 | Friedman et al. |
| 2009/0300607 A1* | 12/2009 | Ferris et al. .................. 718/1 |
| 2009/0313438 A1 | 12/2009 | Krishnaprasad et al. |
| 2009/0328030 A1* | 12/2009 | Fries ........................ 717/174 |
| 2010/0192143 A1* | 7/2010 | Ingle et al. .................. 717/172 |
| 2010/0257523 A1* | 10/2010 | Frank .......................... 718/1 |
| 2011/0022694 A1* | 1/2011 | Dalal et al. .................. 709/222 |
| 2011/0022812 A1 | 1/2011 | van der Linden et al. |
| 2011/0035802 A1* | 2/2011 | Arajujo et al. .................. 726/23 |
| 2011/0078681 A1 | 3/2011 | Li et al. |
| 2011/0126197 A1* | 5/2011 | Larsen et al. .................. 718/1 |
| 2011/0145816 A1 | 6/2011 | Glikson et al. |
| 2011/0173405 A1 | 7/2011 | Grabarnik et al. |
| 2011/0209064 A1* | 8/2011 | Jorgensen et al. ............. 715/733 |
| 2011/0314466 A1* | 12/2011 | Berg et al. .................... 718/1 |
| 2012/0084769 A1* | 4/2012 | Adi et al. .................... 717/174 |
| 2012/0131577 A1* | 5/2012 | Arcese et al. .................. 718/1 |
| 2012/0151477 A1* | 6/2012 | Sinha et al. .................... 718/1 |
| 2012/0192179 A1* | 7/2012 | Ammons et al. .................. 718/1 |
| 2013/0086578 A1* | 4/2013 | Eilam et al. .................... 718/1 |
| 2013/0132950 A1* | 5/2013 | McLeod et al. .................. 718/1 |

OTHER PUBLICATIONS

Jin et al., The Effectiveness of Deduplication on Virtual Machine Disk Images, SYSTOR'09 Proceedings of SYSTOR 2009: The Israeli Experimental Systems Conference.

Autonomic Cloud Template Adjustment. IPCOM000214915D dated Feb. 13, 2012.

Pool, rdiff 1.0pre Draft. http://librsync.sourcefrog.net/doc/rdiff.html downloaded Aug. 16, 2012.

Zhang et al., Typical Virtual Appliances: An Optimized Mechanism for Virtual Appliances Provisioning and Management, The Journal of Systems and Software 84(2011)377-387.

Borst et al., Distributed Caching Algorithms for Content Distribution Networks, INFOCOM 2010.

Chen et al., Rapid Provisioning of Cloud Infrastructure Leveraging Peer-to-Peer Networks, ICDCS Workshop, 2009, pp. 324-329.

Iceberg, An Image Streamer for Space and Time Efficient Provisioning of Virtual Machines, ICPP Workshop, 2008, pp. 31-38.

Emeneker et al., Efficient Virtual Machine Caching in Dynamic Virtual Clusters, ICAPDS Workshop, 2007.

CommandLineSyntax—xdelta—Command-line flags and Usage, Updated Feb. 4, 2010.

* cited by examiner

GENERATING USER-REQUESTED VIRTUAL MACHINE TEMPLATES FROM SUPER VIRTUAL MACHINE TEMPLATES AND CACHEABLE PATCHES

CROSS-REFERENCE TO RELATED APPLICATIONS

This application is a continuation of U.S. patent application Ser. No. 13/482,268, filed May 29, 2012, incorporated by reference herein.

FIELD OF THE INVENTION

Embodiments of the invention generally relate to information technology, and, more particularly, to virtual machine (VM) management.

BACKGROUND

Generally, rapidly serving user requests for creating virtual machines (VMs) is a challenge because of the large amount of time required to copy the requested image template from a template repository to the host where the VM will be running, expand the virtual disk, and ultimately boot-up the VM. Additionally, a large number of image templates are commonly available from which users can create a virtual machine, further leading to potential delay. Similarly, there exists a continuous growth in image templates, and image repositories may be geographically distributed.

Accordingly, a need exists for efficiently serving user requests for creating VMs.

SUMMARY

In one aspect of the present invention, techniques for generating super templates to obtain user-requested templates are provided. An exemplary computer-implemented method for creating a virtual machine super template to create a user-requested virtual machine template can include steps of identifying at least one virtual machine super template to be created via analyzing at least one existing template in a repository and/or a user-defined combination of software, creating the super template by installing software requested by the user to be within the super template, and creating a user-requested virtual machine template by un-installing software from the super template that is not required in the user-requested template and/or adding software to the super template required in the user-requested template that is not present in the super template.

Another aspect of the invention includes techniques for generating a user-requested template. Such techniques include creating a super template based on user-defined criteria identifying software to be included in the super template, generating a user-requested template by un-installing software from the super template that is not required in the user-requested template, creating a patch corresponding to the super template and the user-requested template that includes a set of instructions to generate the user-requested template from the super template, and caching the super template, the user-requested template and the corresponding patch in a repository.

Yet another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes minimizing network traffic in serving user requests for VMs by creating and caching super templates. Specifically, at least one embodiment of the invention includes using super templates as cached elements at a cloud delivery location and patching the super templates to obtain user-requested templates. Additionally, at least one embodiment of the invention includes designing optimal super templates so that network flow or the service time of a user request is optimized.

As used herein, a super template is a template that includes more software than is needed by a particular user request. As described herein, a user request for a template is satisfied by applying a block-based patching operation on an appropriate cached super template. At least one embodiment of the invention includes using small-sized diffs or patches, leading to savings in turnaround time of requests and network bandwidth. Further, as detailed herein, aspects of the invention include identifying which super templates to create by analyzing existing templates in a repository and/or user-defined combinations of software, and solving an optimization problem to identify which of the templates (including the super templates) to use to minimize cost.

Figure 1:
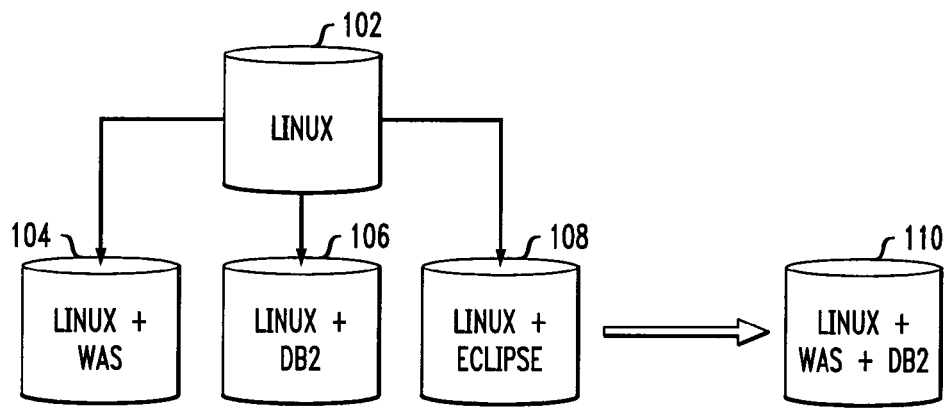
FIG. 1 is a diagram illustrating an example super template formation, according to an embodiment of the present invention.

FIG. 1 is a diagram illustrating an example super template formation, according to an embodiment of the present invention. By way of illustration, FIG. 1 depicts templates that users want depicted, namely, templates 102, 104, 106 and 108. Based thereon, FIG. 1 also depicts a super template 110. As noted herein, a super template includes more installed software than what may be wanted by a user. It should also be noted that, in some cases, a super-template can itself be one of the user-requested templates. Additionally, in some instances, a super template may not necessarily include all of the software within a user-requested template.

Super templates can be cached in close proximity to cloud delivery locations and patched to create the user-requested templates. A patch can include the necessary information to supplement and/or modify the super template to achieve the target user-requested template.

At least one embodiment of the invention includes the ability to convert between templates using patches or diffs. As used herein, the terms "patch" and "diff" are used interchangeably. Accordingly, a diff or patch includes a set of instructions that take a base image (super template) and transforms the image to another image referred to herein as the target image (user-requested template). A patch applied to a super template can remove software as well as add missing software. Also, the techniques detailed herein can use binary diffs as well as file-based diffs.

Figure 2:
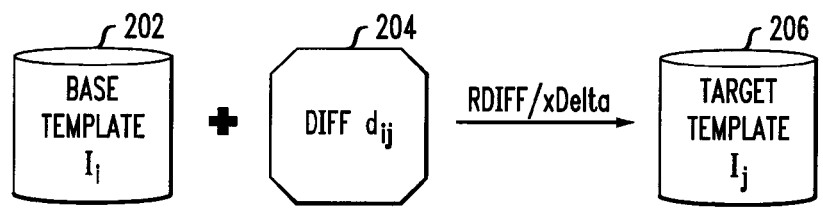
FIG. 2 is a diagram illustrating an example approach to convert between image templates, according to an embodiment of the present invention.

FIG. 2 is a diagram illustrating an example approach to convert between image templates, according to an embodiment of the present invention. By way of illustration, FIG. 2 depicts a base template $I_i$ 202, a diff $d_{ij}$ 204 and a target template $I_j$ 206. As illustrated in FIG. 2, 'Rdiff' is a tool that allows both the creation of the diff that converts base template $I_i$ to target Ij, and also the subsequent use of the diff to generate target template $I_j$ using base template $I_i$ and the diff.

A diff can capture differences between base template $I_i$ and target template $I_j$ such as, for example, virtual hardware properties and software stack.

Figure 3:
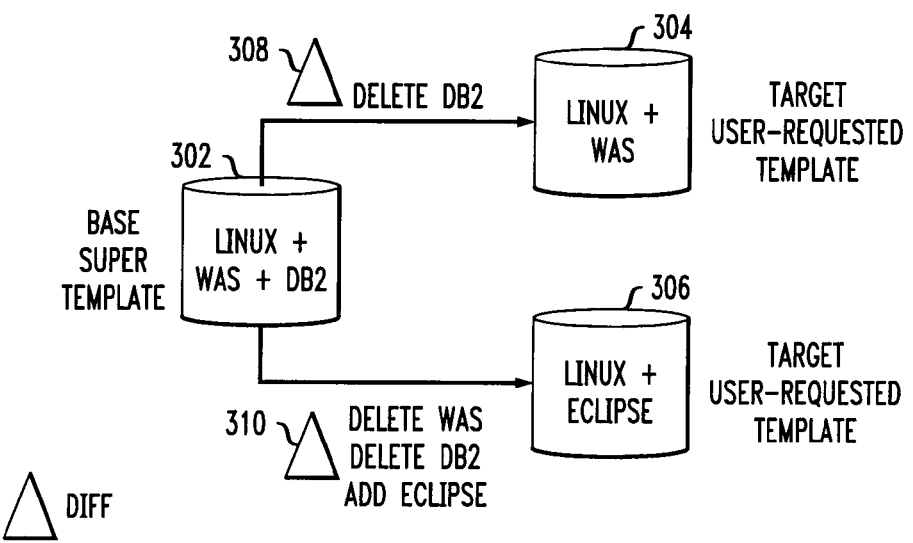
FIG. 3 is a diagram illustrating an example embodiment of the present invention.

FIG. 3 is a diagram illustrating an example embodiment of the present invention. By way of illustration, FIG. 3 depicts a base super template 302, a target user-requested template 304, a target user-requested template 306 and diffs 308 and 310. As illustrated in FIG. 3, diff 308 deletes software from the base super template 302 to generate target user-requested template 304, while diff 310 both deletes and adds software to base super template 302 to generate target user-requested template 306.

Figure 4:
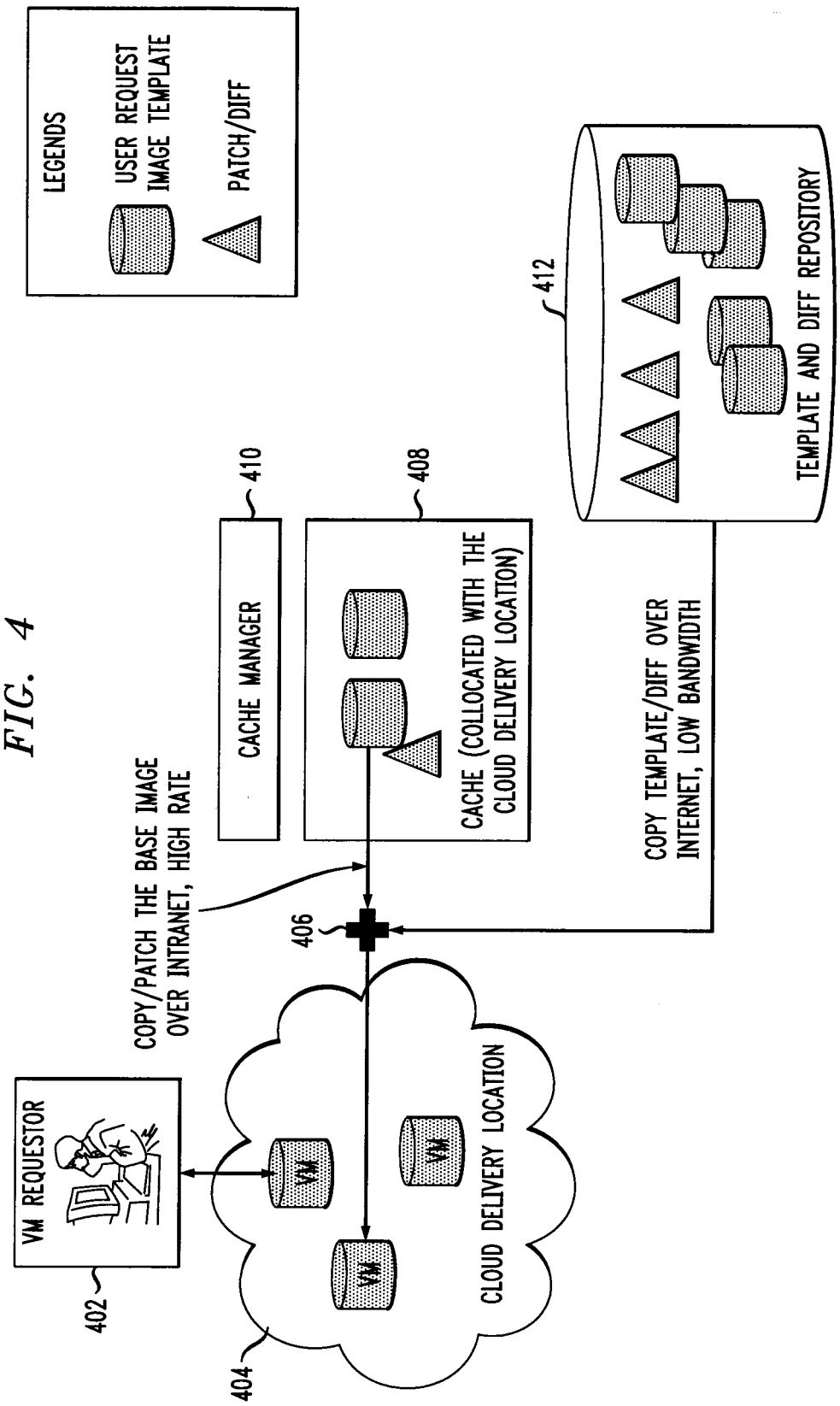
FIG. 4 is a diagram illustrating caching image templates and diffs to serve a user request, according to an embodiment of the present invention.

FIG. 4 is a diagram illustrating caching image templates and diffs to serve a user request, according to an embodiment of the present invention. By way of illustration, FIG. 4 depicts a VM requestor 402, a cloud delivery location (including VMs) 404, a diffing/patching operation 406, a cache 408 including a cache manager component 410, and a template and diff repository 412. As illustrated in FIG. 4, the cache 408 includes user-requested image templates as well as patches/diffs. Further the cache 408 is collocated with the cloud delivery location 404, and from the cache, a base image can be copied/patched over an intranet with a patching operation 406 performed to achieve an instance of the target template. The aforementioned patching operation is achieved using a template/diff copied over the network from the repository 412.

By way of example, the following cases can accrue when the size of the cache is fixed. One case includes the requested template being in the cache. When a request for a particular image template (say, I) arrives, if the cache contains I, the image template is copied to the target host where the VM pertaining to this will be instantiated.

Another case includes the requested template being created from another template. If the template I is not present, an existing template in the cache (say, J) can be used and patched (or diffed) to obtain I. Two sub-cases may accrue: In one sub-case, the diff is present in the cache. In this sub-case, there is no need to seek anything from the image repository, and network bandwidth between the cloud site and the repository can be saved. In another sub-case, the diff is not present in the cache. In this sub-case, the image repository is accessed and the diff is obtained over the intervening network. This consumes bandwidth but is likely more efficient than seeking the entire image file J.

Yet another case involves the requested template being fetched from a repository. In such a case, despite caching, the only option is to fetch the image template J from the image repository. This may be the case because any diff to create J from any image template may be almost as big as the size of J and therefore it may be economical to simply fetch J.

Accordingly, as detailed herein, an aspect of the invention includes caching super templates instead of caching just the templates. The super templates can include a super-set of software from the existing multiple image templates in the repository. Further, as described herein, to create a user-requested template J, an example embodiment of the invention can include patching a super template S that contains most of (or more than) the software that belongs within J. When a super template is used as a base, the diff sizes can be considerably smaller and independent of the software installed within the VM template, while the patching times can remain unaffected.

Figure 5:
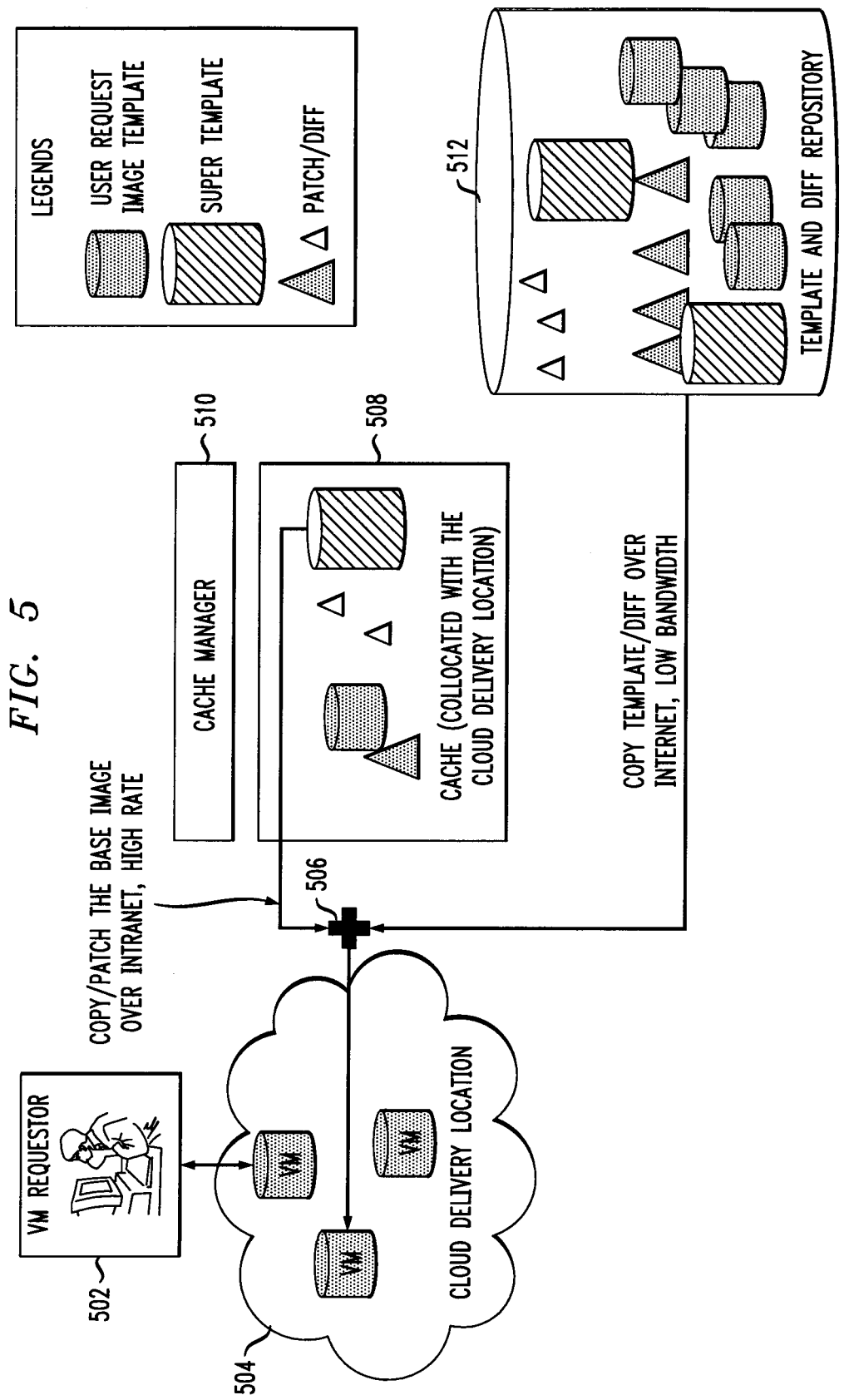
FIG. 5 is a diagram illustrating caching image super templates and diffs to serve a user request, according to an embodiment of the present invention.

FIG. 5 is a diagram illustrating caching image super templates and diffs to serve a user request, according to an embodiment of the present invention. By way of illustration, FIG. 5 depicts a VM requestor 502, a cloud delivery location (including VMs) 504, a diffing operation 506, a cache 508 including a cache manager component 510, and a template and diff repository 512. As illustrated in FIG. 5, the cache 508 includes user-requested image templates, super templates as well as patches/diffs. Further, the cache 508 is collocated with the cloud delivery location 504, and from the cache, a base image can be copied/patched over an intranet with a patching operation 506 performed to achieve an instance of the target template. The aforementioned patching operation is achieved using a template/diff copied over the network from the repository 512 (which also includes user-requested image templates, super templates as well as patches/diffs).

As described herein, VM templates can contain one or more software components that users may want as part of the template from which the user VM will be created. If a software s (being requested by a user) is within a source template, the diff being used to create a target template also having an instance of s does not require having the instructions to create s because the source template already has s and the target template is created by uninstalling all of the non-required software from the source template. Thus, diff size is independent of the size of s.

Also, the size of a diff can be proportional to the size of the software s which is not in the source template but is needed in the target template. Accordingly, the network flow can be proportional to the sum of the rate of requests for those software components which are not included in the super template multiplied by the size of such software. As such, an aspect of the invention includes minimizing the network flow (or equivalently maximizing the network flow which can be delivered from the cached super template).

At least one embodiment of the invention includes an optimization problem formulation to identify the contents of super templates. By way of example, consider the following:

$I2S_k$ is an image-to-software matrix for each operating system k;

$I2S_{kpq}=f_{kp}$ if $soft_{kq}$ is part of image $I_{kp}$, otherwise 0, where $f_{kp}$ is the rate of requests for template $I_{kp}$, where $I_{kp}$ is the $p^{th}$ image with operating system k, and where $soft_{kq}$ is the $q^{th}$ software that can be installed on operating system k;

$OS_k$=the size of operating system k; and $IS_k$=the approximate overall size of any template that includes operating system k but excluding $OS_k$.

Decision variables include the following:

$n_k$=the number of super templates having operating system k; and $s_{ki} \in \{0,1\}$: if 1 implies that software $soft_{ki}$ is part of the super template.

Additionally, $size_{ki}$=the size of software $soft_{ki}$, and C=capacity of cache. Accordingly, optimization can be formulated as follows:

$$\max \sum_k \sum_i f'_{ki} size_{ki} s_{ki};$$

$$\sum_k n_k (OS_k + IS_k) \leq C$$

(The sum of the size of all of the templates less than or equal to C);

$$\sum_i s_{ki} size_{ki} \leq n_k IS_k,$$

where $n_k \in \{0, 1, 2, \ldots\}$ (The sum of the sizes of the selected software to be part of the super templates should be less than or equal to the sum of the maximum size of a super template multiplied by the number of super templates); and $f'_{ki}=(I2S_k*1_i)^t*1 \forall k,i$ (This computes the cumulative rate of requests for software $soft_{ki}$ from the matrix $I2S_k$.)

The output of the above optimization problem is a decision on how many super templates there will be, denoted by $n_k$, and what software $soft_{ki}$ is selected to be put in the union of the $n_k$ super templates, denoted by $\{s_{ki}\}$. Recall that if $s_{ki}$ is defined to be 1, then $soft_{ki}$ is selected to be included into the overall union, otherwise it is not to be included. The instantiation of $s_{ki}$ to 1 merely indicates that $soft_{ki}$ is included in the union of the $n_k$ super templates, but it does not indicate in which particular super template the software has to be placed.

As further described herein, an aspect of the invention includes concretizing the structure of each of the $n_k$ super templates. The objective function is chosen to minimize the network flow. Any software which is required as part of the user requested template but is not within the super template used to generate the user requested template will be defined as part of the patch or diff. The size of the diff will be proportional to the size of this missing software. Accordingly, if the diff is requested from the repository over the network, network flow will be incurred due to this missing software.

At least one embodiment of the invention includes further identifying which selected software $soft_{ki}$ goes to which instance of a super template. By way of example, input can include all software $soft_{ki}$, the decision of acceptance or rejection, namely $\{s_{ki}\}$ as computed based on the previously discussed optimization, $n_k$, and $IS_k$. Define $I_p$ to be the $p^{th}$ super template image that needs to be constructed, where $1 \leq p \leq n_k$. Essentially, the query is to determine which of the selected software to place within each of the $n_k$ templates. By way merely of example, consider each of the $n_k$ images to be simply the $n_k$ bins, each with available space of $IS_k$.

An ordered list of all software $soft_{ki}$ is defined as follows: In the list, only the selected (that is, $s_{ki}=1$) software is included. Also, the software $soft_{ki}$ in the list can be ordered in the descending order of $size_{ki}$. From this ordered list of software, the next software $soft_{ki}$ is chosen and greedily placed in the next available bin $I_p$ having available space greater than $size_{ki}$.

In a situation where the available space in every bin $I_p$ is less than the size of $size_{ki}$, this software is placed in that bin $I_p$ that has the maximum available space. The final output from the above method is $n_k$ lists of software. Note that as a result of the above placement of software, there may be one or more bins $I_p$ having the sum of the sizes of the software within the bin exceeding $IS_k$, but the union will still be equal to or less than $n_k*IS_k$. If there is still space available in the cache after the above method, at least one embodiment of the invention can include choosing to place rejected ($s_{ki}=0$) software within this available space in a greedy way (that is, biggest $f'_{ki} size_{ki}$ first), but never exceeding the sum of the sizes of all of the software in all of the $n_k$ super templates beyond $n_k*IS_k$.

Additionally, at least one embodiment of the invention includes creating super templates and user requested templates. Super template creation can be carried out manually or automatically. Manual super template creation includes installing all of the software manually into each of the $n_k$ bins described herein. Automatic super template creation includes creating models of the relevant images. These models, once created, can be instantiated and the system can cast each of the bins into a requested format.

Creating user-requested templates from the super templates can also be carried out manually or automatically. User-requested templates are created by un-installing all of the non-required software from the super-template designated to be the one from which to create the user-requested template. The super template has to be booted-up and the unwanted software uninstalled. Thereafter, the remaining missing software is installed. In order to remove any traces of the uninstalled software, zeros are written in the remaining available space in the template.

As noted, the above can be carried out in a manual manner. Additionally, the user-requested templates can be carried out automatically via modifying a template in the above manner at the model level and updating the concrete implementation of the model.

Further, in at least one embodiment of the invention, once all of the super templates and user-requested templates are generated, rdiff or xDelta can be used to compute the diffs. Note that xDelta is software that can be used to create a "delta," diff or patch, given the source and target images. Once the patches for each pair of super template and user-requested template have been computed, at least one embodiment of the invention includes identifying the mapping from the super template to the user requested template which will be used to decide which super template will be used to create which user requested template. This is achieved by choosing that combination of super template and user requested template for which the patch size is the smallest. At least one embodiment of the invention includes computing, for each pair of super template and user requested template, the time it takes to patch the super template to get the user requested template. This time can be chosen to compute the mapping from the super template to the user requested template.

Figure 6:
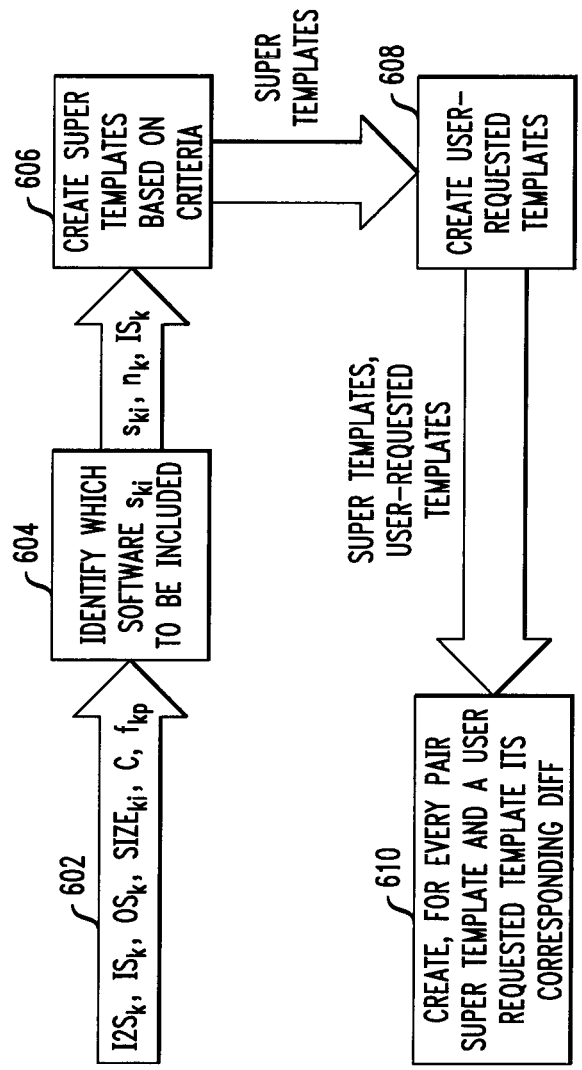
FIG. 6 is a diagram illustrating an example system flow, according to an embodiment of the present invention.

FIG. 6 is a diagram illustrating an example system flow, according to an embodiment of the present invention. Step 602 includes inputting parameters through analysis of request logs and/or user domain knowledge. The parameters can include, for example, $I2S_k$, $IS_k$, $OS_k$, $size_{ki}$, C and $f_{kp}$. Step 604 includes identifying software to help create super templates; that is, identifying which software $s_{ki}$ to be included and forwarding output information such as $s_{ki}$, $n_k$ and $IS_k$. Step 606 includes creating super templates based on the noted criteria. Step 608 includes creating user-requested templates. Step 610 includes creating, for every pair of super template and user-requested template, its corresponding diff.

Figure 7:
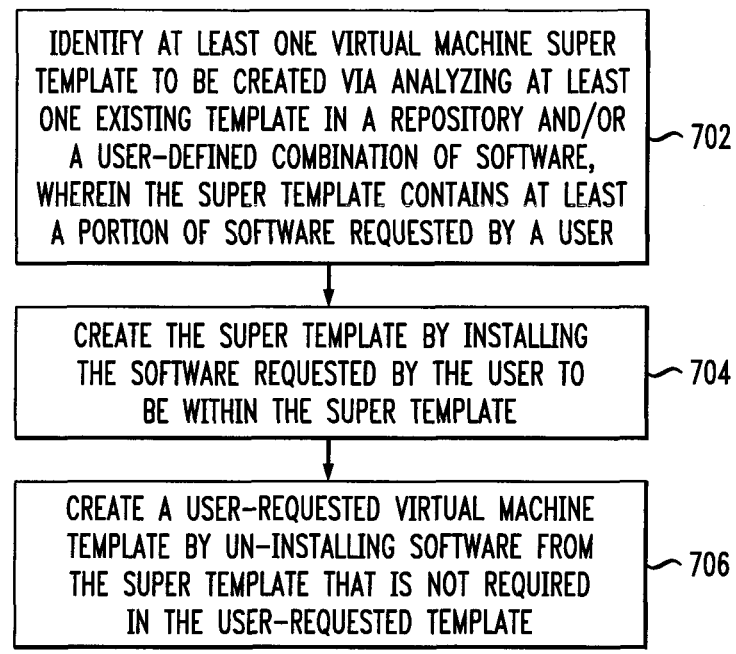
FIG. 7 is a flow diagram illustrating techniques for creating a virtual machine super template to create a user-requested virtual machine template, according to an embodiment of the invention.

FIG. 7 is a flow diagram illustrating techniques for generating a virtual machine super template to create a user-requested virtual machine template, according to an embodiment of the present invention. Step 702 includes identifying at least one virtual machine super template to be created via analyzing at least one existing template in a repository and/or a user-defined combination of software, wherein the super template contains at least a portion of software requested by a user. This analyzing step can include analyzing a request log of user-requested templates and sizes of software installed within the user-requested templates to determine what software is to be within each super template.

As detailed herein, this identifying step can include solving an optimization problem that includes constraints on capacity on a cache and/or size of an expected size of the super template.

Step 704 includes creating the super template by installing the software requested by the user to be within the super template. Step 706 includes creating a user-requested virtual machine template by un-installing software from the super template that is not required in the user-requested template. As described herein, creating the super template as well as creating the user-requested virtual machine template can be carried out manually and/or automatically.

As described herein, use of the at least one super template decreases network flow over a network.

The techniques depicted in FIG. 7 can additionally include creating a patch (also referred to herein as a "diff") between the super template and the user-requested template, where the patch includes a set of instructions to transform a base template to a target template. The set of instructions includes instructions to remove software and/or add software. Also, the patch can capture at least one difference between the base template and the target template. Such a difference can include a virtual hardware property, a software stack, etc.

Further, the techniques depicted in FIG. 7 can include caching the super template. Also, as described herein, at least one embodiment of the invention can include using a cached super template and corresponding patch to generate a user-requested template upon receipt of a request for provisioning of the user-requested template.

As also detailed herein, at least one embodiment of the invention can include techniques for generating a user-requested template. Such techniques include creating a super template based on user-defined criteria identifying software to be included in the super template, generating a user-requested template by un-installing software from the super template that is not required in the user-requested template, creating a patch corresponding to the super template and the user-requested template that includes a set of instructions to generate the user-requested template from the super template, and caching the super template, the user-requested template and the corresponding patch in a repository.

Additionally, the techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
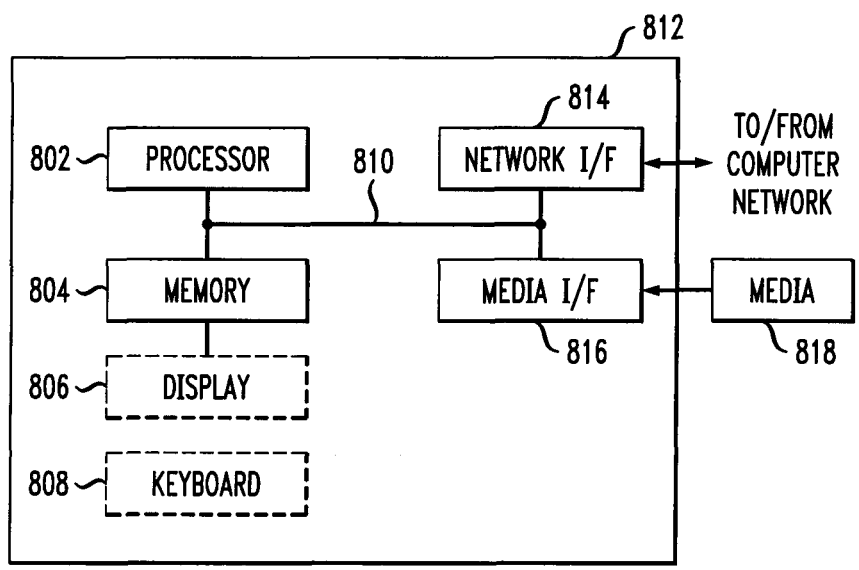
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using super templates as cached elements at a cloud delivery location and patching the super templates to obtain a user-requested template.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating at least one virtual machine super template to create a user-requested virtual machine template, the method comprising steps of:
    identifying at least one virtual machine super template to be created via analyzing at least one existing template in a repository and a user-defined combination of software;
    creating the at least one virtual machine super template by installing the user-defined combination of software to be within the at least one virtual machine super template;
    creating multiple patches for multiple target virtual machine templates, wherein each of the multiple patches comprises a distinct patch between the at least one virtual machine super template and a corresponding one of multiple target virtual machine templates, wherein each patch comprises a cacheable component that includes (i) a fixed set of instructions to un-install software from the at least one virtual machine super template that is not required in the corresponding target virtual machine template and (ii) a fixed set of instructions to add software to the at least one virtual machine super template required in the corresponding target virtual machine template that is not present in the at least one virtual machine super template;
    caching (i) the at least one virtual machine super template and (ii) each of the multiple patches in a searchable repository;
    receiving a request for a user-requested virtual machine template;
    analyzing the request and the searchable repository to determine a given patch from the multiple cached patches will optimize service time for the request;
    fetching (i) the at least one virtual machine super template and (ii) the given patch from the searchable repository;
    creating the user-requested virtual machine template by implementing the given patch to (i) un-install the software from the at least one virtual machine super template that is not required in the user-requested virtual machine template and (ii) add the software to the at least one virtual machine super template required in the user-requested virtual machine template that is not present in the at least one virtual machine super template; and
    caching the user-requested virtual machine template in the searchable repository;
    wherein at least one of the steps is carried out by a computer device.

2. The method of claim 1, wherein use of the at least one virtual machine super template decreases network flow.

3. The method of claim 1, comprising fetching (i) a cached virtual machine super template and (ii) one of the multiple patches from the searchable repository to generate the given user-requested virtual machine template upon receipt of a request for provisioning of the given user-requested virtual machine template.

4. The method of claim 1, wherein said analyzing includes analyzing contents of a request log of user-requested virtual machine templates and sizes of software installed within the user-requested templates to determine what software is to be within each virtual machine super template.

5. The method of claim 1, wherein said identifying comprises solving an optimization problem that includes constraints on capacity on a cache and/or size of an expected size of the at least one virtual machine super template.

6. A method for generating a user-requested virtual machine template, the method comprising:

creating a virtual machine super template based on user-defined criteria identifying software to be included in the virtual machine super template;

generating multiple user-requested virtual machine templates by un-installing software from an instance of the virtual machine super template that is not required in each of the user-requested virtual machine templates and adding software to the instance of the virtual machine super template required in each of the user-requested virtual machine templates that is not present in the instance of the virtual machine super template;

creating multiple patches for the multiple user-requested virtual machine templates, wherein each of the multiple patches comprises a distinct patch between the virtual machine super template and one of the user-requested virtual machine templates, wherein each of the multiple patches comprise a cacheable component that includes (i) a fixed set of instructions to un-install software from the virtual machine super template that is not required in the given user-requested virtual machine template and (ii) a fixed set of instructions to add software to the virtual machine super template required in the given user-requested virtual machine template that is not present in the virtual machine super template; and caching (i) the virtual machine super template and (ii) each of the multiple patches in a searchable repository;

receiving a request for a user-requested virtual machine template;

analyzing the request and the searchable repository to determine a given patch from the multiple cached patches will optimize service time for the request;

fetching (i) the virtual machine super template and (ii) the given patch from the searchable repository; and creating the user-requested virtual machine template by implementing the given patch to (i) un-install the software from the virtual machine super template that is not required in the user-requested virtual machine template and (ii) add the software to the virtual machine super template required in the user-requested virtual machine template that is not present in the virtual machine super template.

* * * * *